Patented May 24, 1938

2,118,391

UNITED STATES PATENT OFFICE 2,118,391

FOOD COMPOUND

Maximiliano Caballero Allain and Charles Walter Tracy, Brooklyn, N. Y.

No Drawing. Application December 14, 1935, Serial No. 54,396

1 Claim. (Cl. 99—100)

This invention relates to new and useful improvements in food compounds, and more particularly it pertains to a food compound prepared primarily from bananas.

The food value of bananas has for a long time been recognized and we are aware that many attempts have been made to treat or process them to render them edible in other forms than raw. All such attempts with which we are familiar, however, have been unsuccessful in the production of a food product which was edible, nutritious and attractive and yet capable of storage for such periods as would render it a salable commodity, particularly in packaged form.

It is the object of the present invention to provide a new and improved food compound of which bananas form the bulk or base, and further, to provide a new and improved process by which the new food compound may be produced.

A feature of the invention resides in a novel method of treatment of the banana whereby discoloration of the finished product is prevented, thus eliminating one of the most serious objections present in all foods of which bananas form the base or bulk, and which are prepared by such methods or processes with which we are familiar.

Another feature of the invention resides in the provision of a food compound, which in its finished state, takes the form of crisp, dry flakes similar in appearance and form to dry breakfast cereals.

Still another feature of the invention resides in a new and novel method or process employed in the manufacture of our new and improved food.

Other features of the invention will become readily apparent as the nature of the invention is better understood for which purpose, reference will be had to the following specification and the appended claim.

As heretofore stated, bananas form the major portion or bulk of our improved food compound, and in accordance with this invention, the bananas are employed in at least two stages or degrees of ripeness, to wit, ripe and partially ripe. In the preparation of our new and improved food, we employ ripe bananas, uncooked bananas, an ingredient which, when mixed with the bananas in accordance with the invention, will produce a dough, which material also possesses a food value and a suitable seasoning or flavoring ingredient, which latter may vary widely, depending upon the flavor desired. This latter ingredient, to wit, the seasoning or flavoring ingredient, may take the form of an ingredient which, in addition to its seasoning qualities, possesses a food value as will be hereinafter more fully described.

While the proportions of ripe and unripe bananas may vary and still produce a highly satisfactory food product, we prefer to employ the following proportions since, in the actual production of the food, we have found them to produce a food having all of the desired qualifications.

| | Percent |
|---|---|
| Ripe bananas (cooked) | 68.88 |
| Ripe bananas (raw) | 21.24 |
| Wheat flour | 8.88 |
| Sugar | 1.00 |

The cooked bananas are prepared by cooking them in their skins by boiling them in water. The bananas are boiled until their skins show signs of opening or bursting along the seams which divide the skins into sections, at which time the cooking step has been completed. This method of cooking retains the food values contained in the skins of the fruit. After the cooking step has been completed, the skins are stripped from the fruit and the fruit are then combined with the raw or uncooked fruit, preferably in the proportions above noted. The fruit are then mashed and the wheat flour added preferably in the quantity above mentioned together with the sugar and the entire mass is thoroughly mixed to form a paste or dough.

The paste or dough is then passed through suitable rollers and formed into a sheet. The rollers are preferably heated to a relatively high temperature which not only dries the paste or dough as it is formed into a relatively thin sheet, but also imparts thereto a rich brown color. After the sheet has been formed as described, it is operated upon by a suitable machine, which operation reduces the sheet to relatively small flakes suitable for serving and packaging.

We have found in actual practice that by proper cooking of the bananas in the manner above described, discoloration thereof is prevented, and we have also found that the cooked fruit, if mixed with uncooked fruit in certain proportions as above described, will produce a mass which also will not discolor.

We have also found that a highly desirable result can be obtained by the use of green or unripe bananas, partially ripe bananas, and ripe bananas, all of which are cooked by boiling in the skins and subsequent treatment as above described, after which banana flour is added in lieu of a cereal flour. The banana flour here mentioned is a product formed from bananas which forms the subject matter of a separate invention upon which we are about to file application for Letters Patent.

The food product as described will naturally have a strong banana flavor but other flavors as desired may be obtained. We prefer, in the seasoning or flavoring of the product, to employ such ingredients of which nuts of various types, fruits, fruit juices, sweet potatoes, are very good examples. Also, seasoning and flavoring ingredients in the form of spices may be employed if desired, and we have also had satisfactory results when combinations of seasoning elements for example, spices and nuts or fruits or fruit juices were employed.

Having thus described the invention, what is claimed as new, is:

The method of preparing a food from bananas which method consists of boiling unripe bananas before the skins have been removed, after boiling, removing the skins, mixing the fruit of the boiled unripe bananas with the fruit of ripe bananas in their raw state, adding a flour, mixing the mass to a pasty consistency, drying the mass and simultaneously forming it into a relatively thin sheet and subsequently reducing the sheet to flakes.

MAXIMILIANO CABALLERO ALLAIN.
CHARLES WALTER TRACY.